(12) United States Patent
Cheng

(10) Patent No.: US 6,535,992 B1
(45) Date of Patent: Mar. 18, 2003

(54) DRAM AUTO-SWAPPING DEVICE

(75) Inventor: Ted Cheng, Hsinchu (TW)

(73) Assignee: Mitac International Corp., Hsinchu (TW)

( * ) Notice: Subject to any disclaimer, the term of this patent is extended or adjusted under 35 U.S.C. 154(b) by 0 days.

(21) Appl. No.: 09/459,308

(22) Filed: Dec. 10, 1999

(30) Foreign Application Priority Data

Dec. 10, 1998 (TW) .......................................... 087120560

(51) Int. Cl.$^7$ ................................................ G06F 11/00
(52) U.S. Cl. ................................................ 714/5; 713/1
(58) Field of Search ........................... 714/5, 3, 2, 42; 713/1, 2

(56) References Cited

U.S. PATENT DOCUMENTS

| | | | | |
|---|---|---|---|---|
| 3,755,791 A | * | 8/1973 | Arzubi ........................ 365/184 |
| 3,803,560 A | * | 4/1974 | DeVoy et al. .................... 714/5 |
| 4,010,450 A | * | 3/1977 | Porter et al. ................. 710/263 |
| 5,237,687 A | * | 8/1993 | Okamoto et al. ............ 713/100 |
| 5,708,791 A | * | 1/1998 | Davis ............................. 711/1 |
| 6,035,420 A | * | 3/2000 | Liu et al. ....................... 714/25 |
| 6,185,696 B1 | * | 2/2001 | Noll ............................. 714/11 |

* cited by examiner

Primary Examiner—Robert Beausoliel
Assistant Examiner—Marc M Duncan
(74) Attorney, Agent, or Firm—Darby & Darby

(57) ABSTRACT

A DRAM auto-swapping device is used to automatically address other available memory segments of a DRAM module of a computer system when the first 64K memory segment of the DRAM module fails to pass the testing performed by the BIOS of the computer system, whereby the computer system can be activated in spite of failure in the first 64K memory segment of the DRAM module.

4 Claims, 2 Drawing Sheets

# DRAM AUTO-SWAPPING DEVICE

BACKGROUND OF THE INVENTION

1. Field of the Invention

The present invention relates to an auto-swapping device. More specifically, it relates to a DRAM auto-swapping device. When the first 64K memory segment of a DRAM module in a computer fails to pass the BIOS testing, the auto-swapping device will access the other available memory segments of the DRAM module automatically such that the computer system can be activated.

2. Description of the Related Art

When a computer system is turned on, the BIOS of the computer system first performs a power on self-test (hereinafter referred as POST). The computer system is then activated after the POST process is completed normally. During the POST process, if the first memory segment (for example, the first 64K memory segment) of a DRAM module equipped in the computer system fails to pass the POST, the computer system is suspended or halted and not able to be activated. Thus, the computer system can not be activated due to the failure of a small memory space (only 64K memory) in the DRAM module. Even though the DRAM module has other available memory segments, they can not be used for activating the computer system.

SUMMARY OF THE INVENTION

Therefore, an object of the present invention is to provide a DRAM auto-swapping device to access the other available memory segments of a DRAM module automatically such that the computer system equipped with the DRAM module can be activated, even when the first memory segment (the first 64K memory segment) of the DRAM fails in the POST process.

The present invention achieves the above-indicated objects by providing a DRAM auto-swapping device, which comprises: an output-port selecting device for selectively enabling a specific output port to output a specific value; and a swap-selection device receiving a first-address signal set, for outputting the first-address signal set or a second-address signal set to access the DRAM according to the output value of the specific output port, wherein the second-address signal set is obtained by carrying out logic operation on the first-address signal set.

When the BIOS does not detect failure of the first 64K memory segment of the DRAM, the swap-selection device outputs the first-address signal set for accessing the first 64K memory segment of the DRAM and the BIOS keeps performing the testing process to activate the computer system.

When the BIOS detects failure of the first 64K memory segment of the DRAM, the output-port selecting device enables the specific output port to output the specific value such that the swap-selection device outputs the second-address signal set for accessing the available memory segments of the DRAM, and the BIOS keeps performing the testing process to activate the computer system.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION OF THE PREFERRED EMBODIMENT

Figure 1:
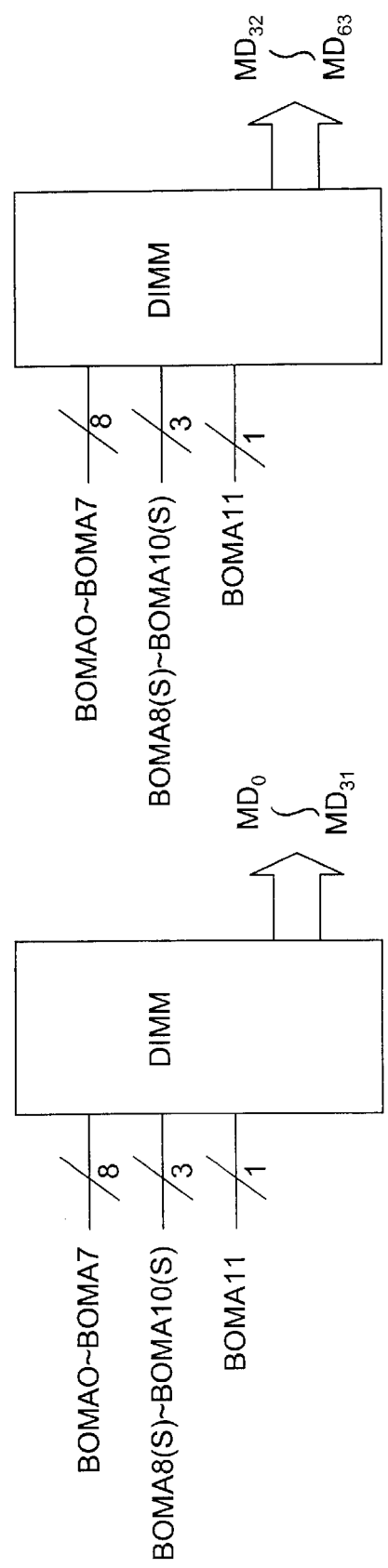
FIG. 1 shows a portion of signal arrangements at two DRAM slots.

FIG. 1 shows a portion of the signal arrangements at two DRAM slots (DIMMs). In this embodiment, the DRAM module has two DRAM units which are coupled to the DRAM slots (DIMMs) so as to provide system memory to a computer system (for example, PC system).

The DRAM module is accessed by using an address-line signal to locate the corresponding memory cells at the assigned address, whereupon data are read out of (or written into) the memory cells at the assigned address via the data bus lines ($MD_0$~$MD_{63}$) in the computer system. For the DRAM module, twelve address lines (BOMA0~BOMA11) in conjunction with the Row Address Strobe signal and the Column Address Strobe signal (the RAS and the CAS signals, not depicted in FIG. 1) are generally used to decode any possible address of the DRAM module, thereby performing the data reading or writing to the DRAM module. The address lines BOMA0~BOMA11 are a portion of the address bus in the computer system.

The object of the present invention is to automatically address other available memory segments of the DRAM module when the first 64K memory segment of the DRAM module fails to pass the BIOS testing, whereby the computer system with the DRAM module can be activated. According to the present invention, a swap-selection device is provided to couple the address signal lines BOMA8~BOMA10. The swap-selection device outputs first-address signals the same as the signals on the address signal lines BOMA8~BOMA10 to address the DRAM module when the BIOS does not detect failure in the first 64K memory segment of the DRAM module. Otherwise, the swap-selection device converts the first-address signals on the address signal lines BOMA8~BOMA10 into second-address signals to access the DRAM module according to a specific logical operation when the BIOS detects failure in the first 64K memory segment of the DRAM module. Consequently, the BIOS skips over the failed 64K memory segment of the DRAM module and switches to test other available memory segments of the DRAM module, thereby continuing the activating process of the computer system.

The present invention will be described in detail hereinafter with reference to a preferred embodiment and the accompanying figure.

Figure 2:
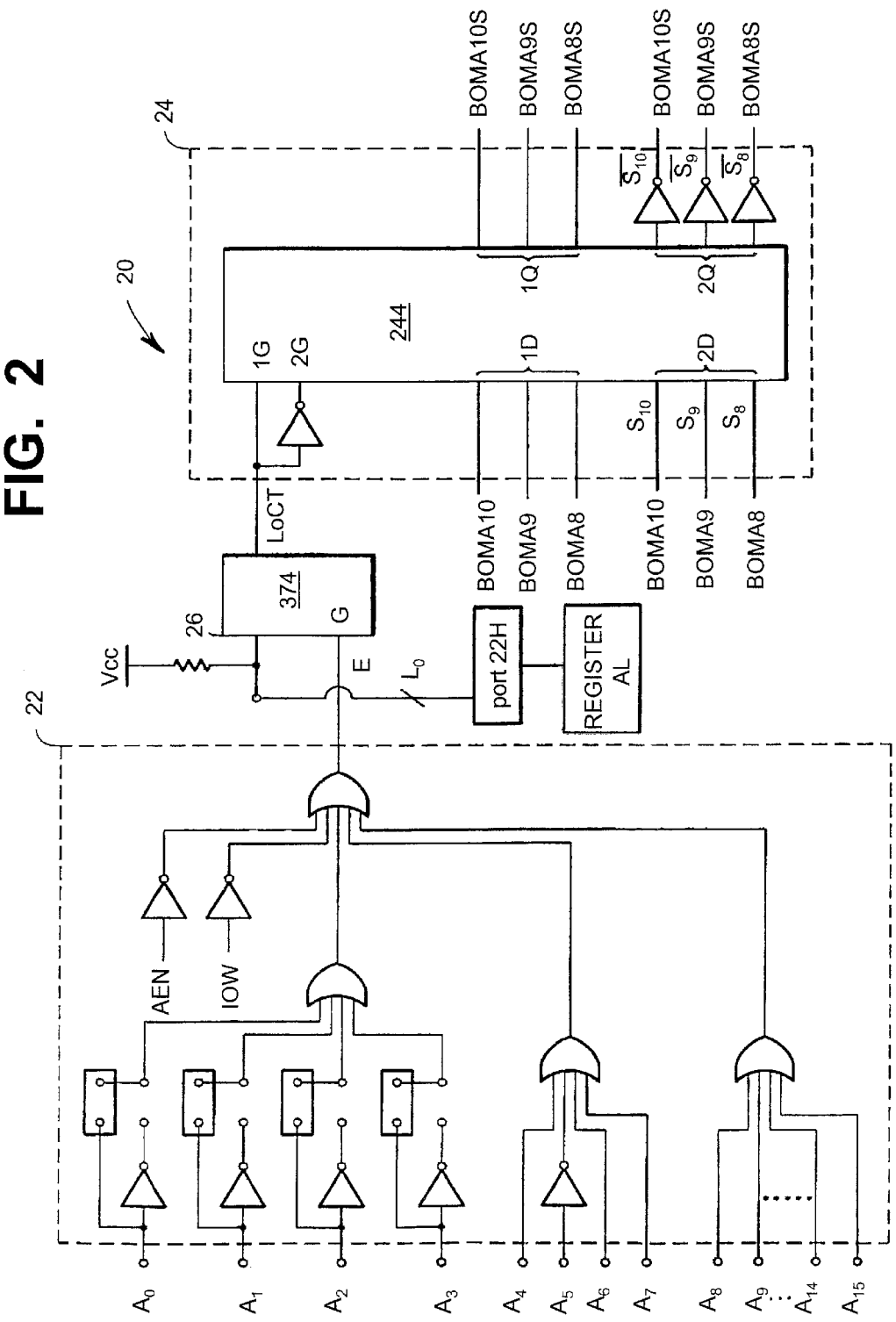
FIG. 2 shows the circuit block diagram according to a preferred embodiment of the present invention.

FIG. 2 shows the circuit block diagram of a DRAM auto-swapping device according to a preferred embodiment of the present invention. In FIG. 2, the DRAM auto-swapping device at least comprises: a output-port selecting device 22 for selectively enabling a specific output port; and a swap-selection device 24 coupling a first-address signal set on the address signal lines BOMA8~BOMA10, for selectively outputting the first-address signal set or a second-address signal set to access the DRAM module. In this embodiment, the swap-selection device 24 mainly comprises a buffering device (IC-244) and four inverters, as depicted in FIG. 2.

The DRAM auto-swapping device operates in conjunction with a predetermined program set up in BIOS to achieve the object of the present invention. The program is described as follows.

|   | JNC    | α         |    | ;NC = memory OK      |
|---|--------|-----------|----|----------------------|
|   | MOV    | AL        | 0  | ;AL = $L_0$          |
|   | OUT    | 22H       | AL | ;$L_0CT=L_0$         |
|   | JMP    | Test-Again|    |                      |
| α | Normal | INIT      |    | ;memory OK, Go Next  |

Therefore, when the BIOS detects failure in the first 64K memory segment of the DRAM module, the BIOS writes a specific value $L_0$ (in this embodiment $L_0$ is "0") into the register AL. Then, the BIOS makes the specific value $L_0$ be outputted from the output port 22H (22H means I/O port address). Of course, the output port can be selected from any one of the output ports 22H~2FH.

In this embodiment, the default output port is 22H. Therefore, the output-port selecting device 22 is designed to be capable of properly decoding the output port address 22H. The signals $A_{15}$~$A_8$ on the address bus are "0", the signals $A_7$~$A_4$ on the address bus are "0010", and the signals $A_3$~$A_0$ on the address bus are "0010", for locating the address of the output port 22H. Both the I/O write-enable signal (IOW) and the address-enable signal (AEN) are "1". Thus, the output-port selecting device 22 decodes the address signals ($A_{15}$~$A_0$), and then outputs a signal (E) having logical value "0". The output-port buffer 26, an IC-374 for example, is activated by the signal E so as to output the signal $L_0$ as the output signal $L_0CT$.

When the BIOS detects failure in the first 64K memory segment of the DRAM module, a logical value "0" is written into the register AL, then appearing at the input terminal of the output-port buffer 26 as the signal $L_0$. Then, the BIOS sends the address signals ($A_{15}$~$A_0$) for assigning the output port 22H to output the signal $L_0$. After the output-port selecting device 22 decodes the address 22H, the output-port buffer 26 is activated by the signal E and outputs the signal $L_0$ ("0") as the output signal $L_0CT$.

The signal $L_0CT$ is "0", therefore the input-enable terminals 1G and 2G of the IC-244 receive logical values "0" and "1" respectively. Consequently, the first-address signal set ($S_8$, $S_9$, $S_{10}$) on the address lines BOMA8~BOMA10 coupled to the input terminals 2D of the IC-244 are sent out to the output terminals 2Q of the IC-244. Then, the first-address signal set ($S_8$, $S_9$, $S_{10}$) at terminals 2Q are further inverted to the second-address signal set ($\overline{S}_8$, $\overline{S}_9$, $\overline{S}_{10}$), coupled to the address lines BOMA8S~BOMA10S for addressing the DRAM module. If the first-address signal set ($S_8$, $S_9$, $S_{10}$) on address lines BOMA8~BOMA10 are "000", they will be inverted into "111" as the second-address signal set ($\overline{S}_8$, $\overline{S}_9$, $\overline{S}_{10}$). Accordingly, the BIOS will skips over the failed memory segment (with initial address: x000xxxxxxxx, located by the address lines BOMA11~BOMA0); the BIOS switches to test the other available memory segments (with initial address: x111xxxxxxxx, located by the address lines BOMA~BOMA0), thereby continuing the POST process to complete the activation of the computer system.

When the BIOS does not detect failure in the first 64K memory segment of the DRAM module, the BIOS performs the operation defined in α step of the above program so as to continue the other testing. In addition, the logical value of $L_0CT$ will not be changed to "0" such that the swap-selection device 24 will output the first-address signal set ($S_8$, $S_9$, $S_{10}$) to the address lines BOMAS8S~BOMAS10S to access the DRAM module.

In this embodiment, the first-address signal set ($S_8$, $S_9$, $S_{10}$) on the address signal lines (BOMA8~BOMA10) are converted when the BIOS detects failure in the first 64K memory segment of the DRAM module. However, the present invention is not merely limited to convert the signals on the address lines (BOMA8~BOMA10); any possible line combination can be selected from the address lines (BOMA11~BOMA0) such that the BIOS can skip over the failed memory segment and keep testing the other available memory segments.

Moreover, the first-address signal set ($S_8$, $S_9$, $S_{10}$) on the address signal lines (BOMA8~BOMA10) are converted to the second-address signals ($\overline{S}_8$, $\overline{S}_9$, $\overline{S}_{10}$) by carrying out an inverting operation on the first-address signals ($S_8$, $S_9$, $S_{10}$). However, the first-address signal set ($S_8$, $S_9$, $S_{10}$) also can be converted to another second-address signal set by carrying out any specific logical operation on the first-address signals.

According to the present invention, the BIOS can skip over the first 64K memory segment of the DRAM module so as to keep testing the other available memory segments of the DRAM module and perform the POST process, whereby the computer system can he activated in spite of failure in the first 64K memory segment of the DRAM module.

While the invention has been described by way of example and in terms of the preferred embodiment, it is to be understood that the invention is not limited to the disclosed embodiments. For example, the first memory segment of the DRAM module is not limited to be the first 64K memory segment. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A DRAM auto-swapping device, for automatically accessing the available memory segments of a DRAM module in a computer system when a first memory segment of said DRAM module fails to pass a test performed by a BIOS of the computer system, whereby said computer system can be activated, said device comprising:

an output-port selecting device for selectively enabling a specific output port to output a specific value; and a swap-selection device receiving a first-address signal set, for outputting said first-address signal set or a second-address signal set to access said DRAM module according to said specific value outputted from said specific output port, wherein said second-address signal set is obtained by performing an inverting operation on said first-address signal set;

wherein, when the BIOS does not detect failure of the first memory segment of said DRAM, said specific output port does not output said specific value and said swap-selection device outputs said first-address signal set and the BIOS keeps performing the testing process to activate said computer system; and when the BIOS detects failure of the first memory segment of the DRAM, said output-port selecting device enables said specific output port to output said specific value such that said swap-selection device outputs said second-address signal set for accessing the available memory segments of said DRAM module and the BIOS keeps performing the test to activate said computer system.

2. The DRAM auto-swapping device as claimed in claim 1, wherein a portion of signal lines on an address bus of said computer system serves to provide said first-address signal set, and another portion of the signal lines on the address bus of said computer system couples to access said DRAM module.

3. The DRAM auto-swapping device as claimed in claim 1, wherein said output-port selecting device couples to an address bus of said computer system; and when the BIOS detects the failure of the first memory segment of said DRAM module, the BIOS writes said specific value to a register of said computer system and said output-port selecting device decodes an address signal for enabling said specific output port to output said specific values.

4. The DRAM auto-swapping device as claimed in claim 1, wherein said output-port selecting device is an address-decoding device implemented to decode an address of said specific output port.

* * * * *